United States Patent [19]

Matsuura et al.

[11] Patent Number: 4,725,973
[45] Date of Patent: Feb. 16, 1988

[54] VECTOR PROCESSOR

[75] Inventors: Tsuguo Matsuura, Hadano; Toshihiko Odaka, Ebina, both of Japan

[73] Assignee: Hitachi, Ltd., Tokyo, Japan

[21] Appl. No.: 545,160

[22] Filed: Oct. 25, 1983

[30] Foreign Application Priority Data

Oct. 25, 1982 [JP] Japan .................................. 57-187828

[51] Int. Cl.$^4$ ............................ G06F 9/00; G06F 9/28
[52] U.S. Cl. ...................................... 364/736; 364/900
[58] Field of Search ............... 364/730, 736, 748, 749, 364/200 MS File, 900 MS File

[56] References Cited

U.S. PATENT DOCUMENTS

| | | | |
|---|---|---|---|
| 3,541,516 | 11/1970 | Senzig | 364/748 |
| 4,127,899 | 11/1978 | Dachtera | 365/154 |
| 4,193,127 | 3/1980 | Gersbach | 365/189 |
| 4,270,181 | 5/1981 | Tanakura et al. | 364/736 |
| 4,302,818 | 11/1981 | Niemann | 364/200 |
| 4,400,768 | 8/1983 | Tomlinson | 364/200 |
| 4,435,765 | 3/1984 | Vchida et al. | 364/736 |
| 4,447,891 | 5/1984 | Kadota | 365/189 |
| 4,489,381 | 12/1984 | Lavallee et al. | 364/206 |
| 4,490,786 | 12/1984 | Nakatani | 364/736 |
| 4,525,796 | 6/1985 | Omoda et al. | 364/730 |

Primary Examiner—Gary V. Harkcom
Assistant Examiner—Dale M. Shaw
Attorney, Agent, or Firm—Antonelli, Terry & Wands

[57] ABSTRACT

A vector processor for executing vector instructions comprises a plurality of vector registers and a plurality of pipeline arithmetic logic units. The vector registers are constructed with a circuit which operates in a speed equal to 2n times as fast as the processing speed of the pipeline arithmetic logic units. Either the read or the write operation from or to the vector registers are carried out in the time obtained by a processing cycle of each of the pipeline arithmetic logic units multiplied by n/2.

10 Claims, 4 Drawing Figures

VECTOR PROCESSOR

BACKGROUND OF THE INVENTION

1. Field of the Invention

The present invention relates to a vector-processing-oriented digital computer for executing high-speed vector operations, referred to as a vector processor hereinafter, and particularly to the construction of a vector register included in the vector processor.

2. Description of the Prior Art

Conventionally, various vector processors have been proposed for performing high-speed data processing, for example, calculation of a matrix having a great number of elements which often appears in scientific data processing. One such vector processor has vector registers for improving the operational data transfer performance so that a plurality of pipeline-type arithmetic logic units included in the vector processor are effectively operated concurrently at a high speed.

FIG. 1 illustrates a general block diagram of a vector processor comprising the type of vector registers explained above.

According to FIG. 1, a plurality of vector registers 1 (VR1 to VRn) are capable of storing a sequence of element data items, for example, each vector register can store 64 elements, each element consisting of eight bytes. Vector elements necessary for an operation are sequentially fetched from the main storage (MS) 5 through fetch data lines 10. Each vector element is distributed by a selector circuit 2 and is written through a write data line 6 in a vector register 1 having the number specified by a vector instruction. Afterwards, each vector element is sequentially read from a proper vector register via a data line 7 and is delivered through a selector circuit 3 to be input as an operand to a desired arithmetic logic unit 4 via an operand line 8. The operation result output from an arithmetic logic unit 4 is fed to the selector circuit 2 via an operation result line 9 and is sequentially written in the specified vector register 1 through the data write line 6. Each arithmetic logic unit 4 is a pipeline-type arithmetic logic unit independent of the other units, for example, it is a floating-point number adder, a floating-point number multiplier, or the like. The final resultant vector obtained by repeating the data transfer between arithmetic logic units 4 and vector registers 1 is delivered from vector registers 1 to a selector circuit 3, then it is sequentially stored in the main storage 5 through the write data line 11.

In FIG. 1, reference numeral 13 indicates a timing generator circuit for allowing a vector register (VR) 1 and a pipeline arithmetic logic unit 4 to operate at the same operating speed. Moreover, the operating speed of the main storage 5 is set to be equal to that of both the vector register (VR) 1 and the pipeline arithmetic logic unit 4 using another timing generator circuit (not shown).

Reference numeral 14 is a vector operation control section for controlling operations of the selector circuit 2, the selector circuit 3, the vector register (VR) 1, and the pipeline arithmetic logic unit 4 according to a vector instruction which has been read from the main storage 5.

Features of a vector processor having vector registers like those depicted in FIG. 1 will be explained in conjunction with a simple vector operation example. The following FORTRAN statements will be discussed assuming that the number of vector elements to be operated on in the pertinent vector operation is L.

$$DO\ 10\ I=1, L$$

$$10\ Y(I) = A(I) + B(I)*C(I)$$

This processing is expressed as follows by use of vector instructions for each element.

1. Vector Load VR "0" ⇐ A
2. Vector Load VR "1" ⇐ B
3. Vector Load VR "2" ⇐ C
4. Vector Multiply VR "3" ⇐ VR "1"*VR "2"
5. Vector Add VR "4" ⇐ VR "0" + VR "3"
6. Vector Store VR "4" ⇒ Y Where, VR stands for vector register. Each vector instruction is executed to perform an operation and a data transfer repeatedly L times, that is, for each of all L elements.

In general, the number of data transfer operations with the main storage is substantially reduced in a vector processor having vector registers by temporarily storing vectors obtained as intermediate results after a vector operation in the vector registers and by storing only the final resultant vector in the main storage; therefore, a data transfer performance necessary for an operation can be guaranteed by providing vector registers allowing high-speed read and write operations even if a main storage has a lower access speed as compared with that of vector register operations.

Next, the vector instructions 4 and 5 above will be examined precisely. VR "3" for storing the multiplication result of the instruction 4 is used for reading the operand of the following instruction 5 for adding vectors. If operations are controlled so that the vector addition instruction 5 is initiated only after the results of all elements (L in number) are written in VR "3", concurrent operations of a plurality of arithmetic logic units cannot be efficiently utilized, thus a considerable processing time is necessary. As explained above, the succeeding vector instruction must be set in a wait state before it reads the operation result of the preceding instruction or the VR for storing the fetched data as its operand. This waiting relationship also resides between the vector instruction 4 and vector instruction 2 or 3, between the vector instructions 1 and 5, and between 5 and 6, respectively. A chaining theory is adopted to solve this problem of the waiting relationship. The chaining theory is applied to the chaining operation as follows: When a data item read from the main storage or an operation result obtained by a vector instruction is written in a vector register, the written data is transferred to the main storage or is transferred to an arithmetic logic unit as an operand of the succeeding vector instruction immediately after the write operation. This chaining feature enables a plurality of arithmetic logic units to effectively operate even in a calculation of a polynomial-type vector, thereby improving the simultaneous operation and realizing a high-speed processing.

As is clear from the foregoing explanation, the chaining feature is adopted as a method to speed up execution of vector instructions by use of the relationship between the two continuous vector instructions. Whether the chaining feature can be satisfactorily carried out or not depends on the read/write operation performance of the vector registers.

The vector processing and the chaining are taught in the literature of Richard M. Russel "The Cray-1 Computer System" in "Communications of the ACM" 1978, Jan. Vol. 21, No. 1, pp. 63-72.

SUMMARY OF THE INVENTION

An object of the present invention is to provide a structure for allowing simple read and write operations on vector registers so as to smoothly perform the chaining processing for a high-speed operation of a vector processor. The chaining feature must be implemented to enable the simultaneous read and write operations on the same vector register during the time period of one cycle.

It can be considered to share a vector instruction among elements so as to concurrently execute the vector instruction by a plurality of arithmetic logic units, thereby realizing high-speed vector processing. For example, a vector instruction is shared between element "I" (0, 2, ... I ... ) and element "I+1" (1, 3, ... I+1 ... ), and these two element series are simultaneously read from the vector register array and are concurrently processed by two arithmetic logic units; then, the results obtained from these two arithmetic logic units are simultaneously written in the vector register array. In the example above, the vector element is divided into two series. In general, if the number of the arithmetic logic units available for said concurrent operation is n, the vector element can be divided into n series for the concurrent processing.

For this purpose, a vector register must simultaneously read or write n elements during the time period of one cycle.

To achieve the above-mentioned object, the vector processor according to the present invention utilizes a circuit for each vector register, said circuit being connected to a pipeline-type arithmetic logic circuit and having a processing speed 2n times as fast as that of said pipeline-type arithmetic logic unit. A read or write operation on the vector register is carried out in a time period obtained by multiplying the aforementioned processing cycle of the pipeline-type arithmetic logic unit by ½ n. Furthermore, n read operations and n write operations can be simultaneously carried out in the same vector register.

DESCRIPTION OF THE PREFERRED EMBODIMENT

Figure 1:
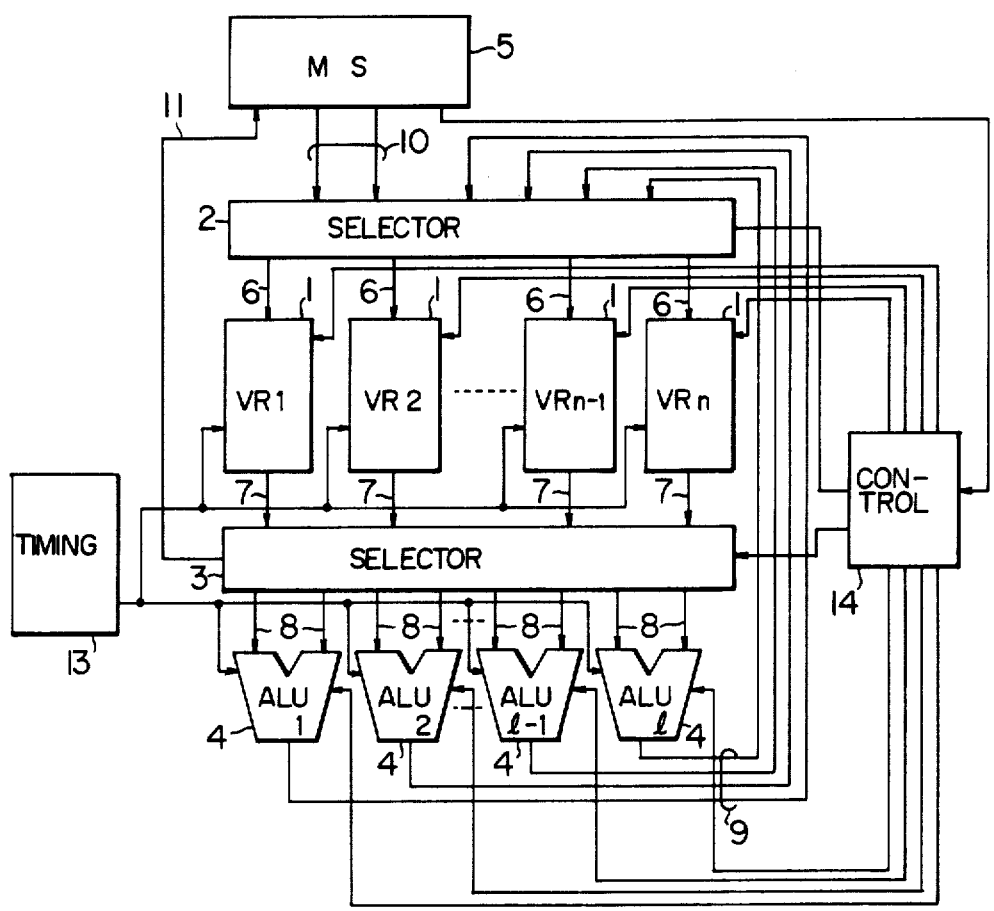
FIG. 1 depicts a general block diagram of a vector processor.
Figure 2:
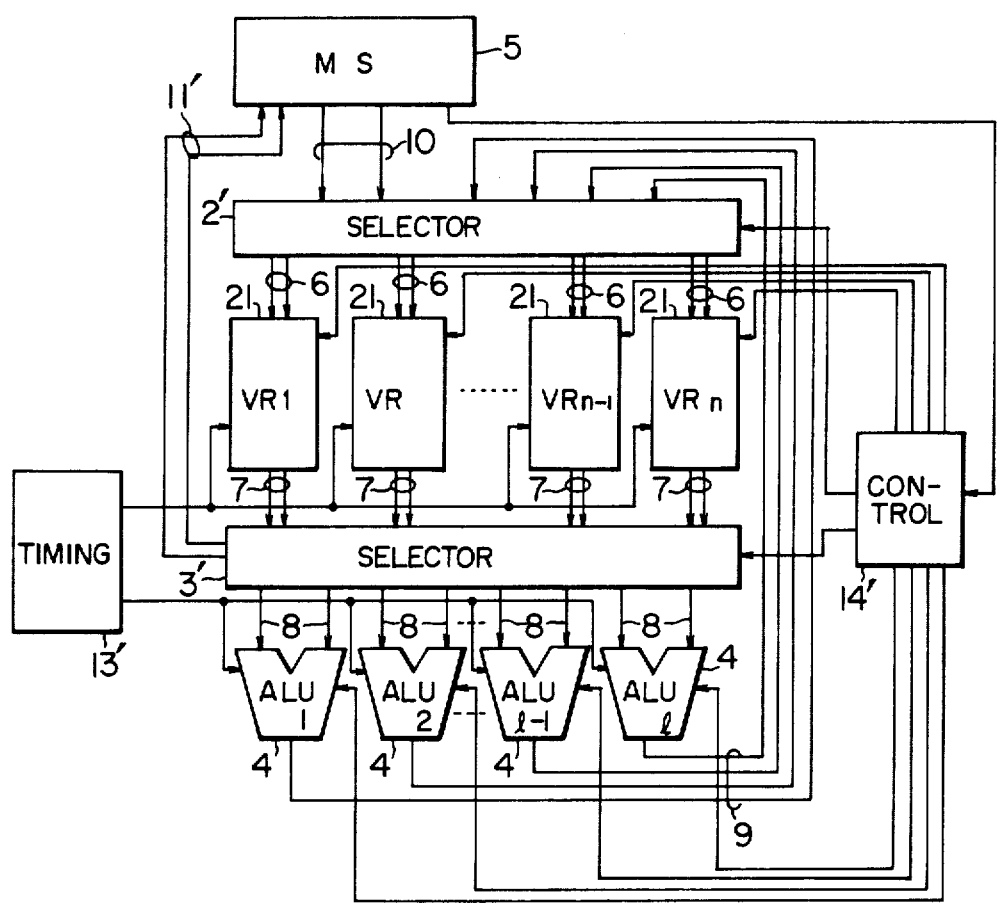
FIG. 2 shows another block diagram of a vector processor.

FIG. 2 illustrates a block diagram of a vector processor which is an embodiment of the present invention. The same reference numbers are assigned to the same constituent elements in FIGS. 1 and 2. The number of the element series to be concurrently processed is assumed to be two in this case. According to FIG. 2, each vector register (VR) 21 has two write data lines 6 and two read data lines 7.

A selector circuit 2' transfers outputs from two fetch data lines 10 of the main storage 5 or from two pipeline arithmetic logic units 4 to a vector register (VR) 21 through two data lines 6. The selector circuit 3' transfers the data output from the vector register (VR) 21 via two data lines 7 to the main storage 5 or two pipeline arithmetic logic units 4 via lines 8 or to the main storage 5 through two write data lines 11'.

Reference numeral 13' indicates a timing generator circuit for enabling the pipeline arithmetic logic unit 4 to operate at a speed four times as fast as the vector register (VR) 21. The operating speed of the main storage 5 is set to be the same as that of the pipeline arithmetic logic unit 4.

Figure 3:
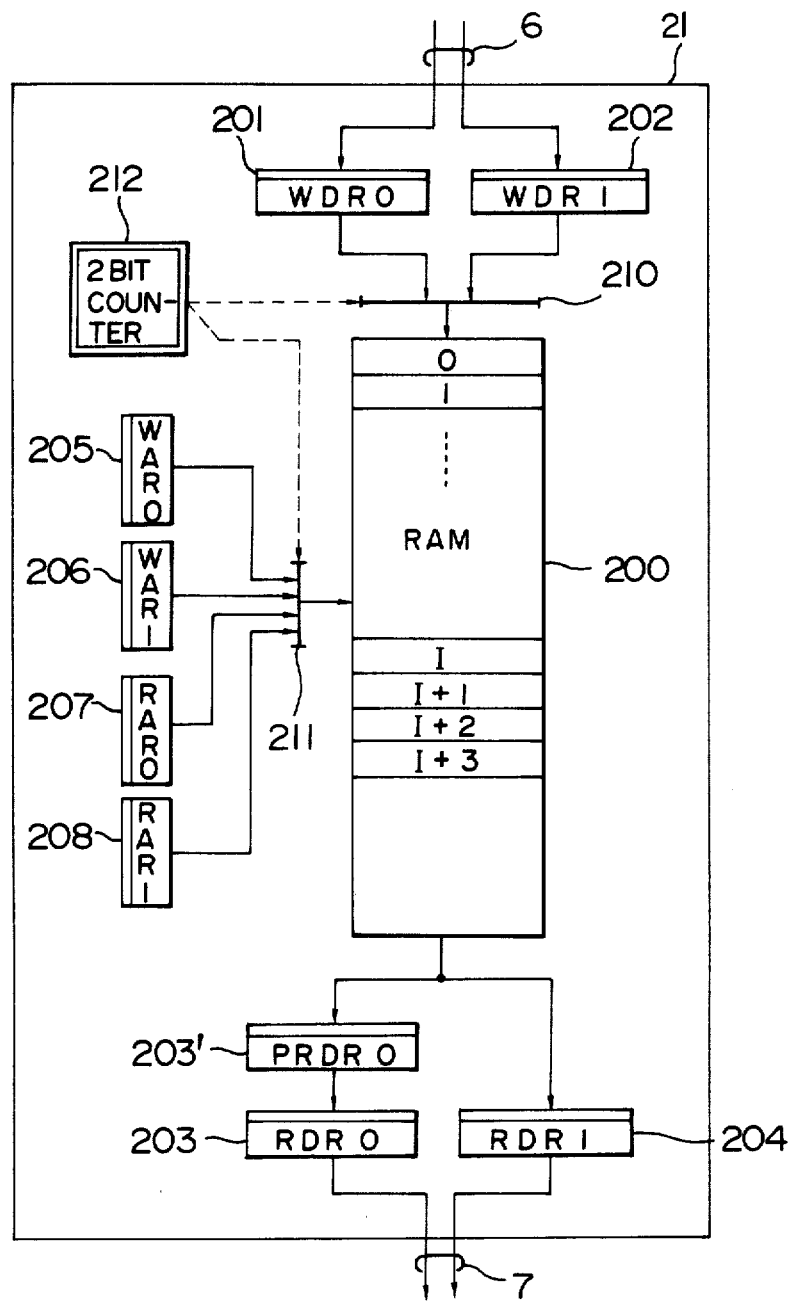
FIG. 3 shows an embodiment of the present invention.

FIG. 3 is the diagram illustrating details of the vector register 21 according to FIG. 2. A RAM 200 is adopted in this example.

According to FIG. 3, reference numerals 201 and 202 indicate write data registers WDR$\phi$ and WDR1, reference numerals 203', 203, and 204 are read data registers PRDR$\phi$, RDR$\phi$, and RDR1, reference numerals 205 and 206 indicate write address registers WAR$\phi$ and WAR1, and reference numerals 207 and 208 indicate read address registers RAR$\phi$ and RAR1. Furthermore, reference numerals 210 and 211 are selectors and reference numeral 212 indicates a 2-bit counter. The digit 0 appended to the reference numeral of a register indicates that the register processes the even-numbered vector element series I (0, 2, 4, ..., I, ... ), whereas the digit 1 appended indicates that the pertinent register processes the odd-numbered vector element series I+1 (1, 3, 5, ..., I+1, ... ).

Figure 4:
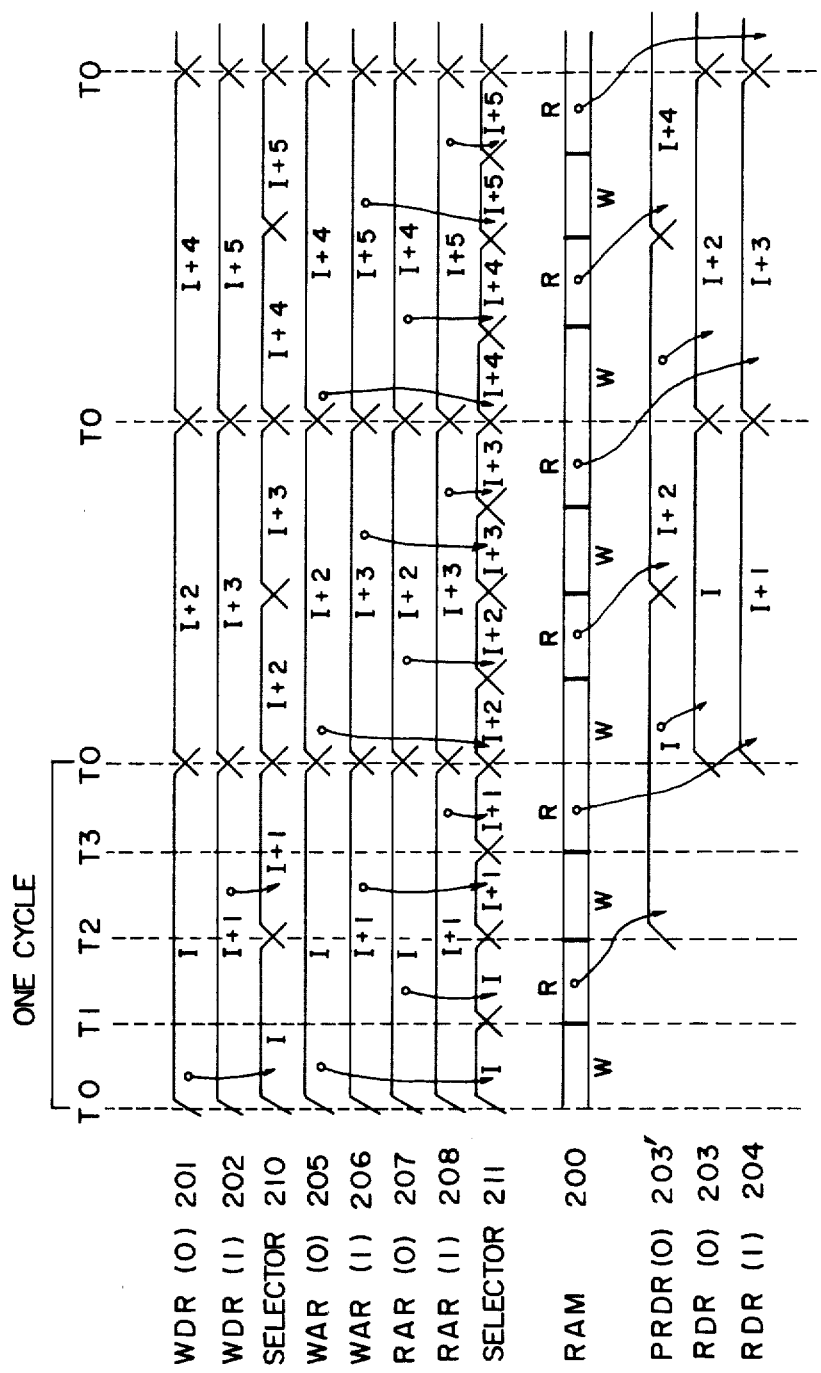
FIG. 4 depicts a timing chart of the basic operations of the embodiment shown in FIG. 3.

FIG. 4 illustrates a timing chart of the basic operations of the embodiment shown in FIG. 3. According to FIG. 3, I, I+1, I+2, and I+3 indicate vector element numbers which are being processed by registers concerned during the pertinent time period. Moreover, W or R designated for the operation of RAM 200 indicates the write or read time period. Furthermore, one cycle is assumed to be equal to the processing cycle of the pipeline-type arithmetic logic unit connected to the vector register array.

FIG. 4 illustrates a timing chart of an operational state where the concurrent processing as well as the chaining processing are ideally carried out to the maximum extent by means of the element division as follows: The element series subdivided into two series, i.e., a series I and a series I+1, which are set to WDR (0) 201 and WDR (1) 202 at 1-cycle intervals, respectively, and are written in RAM 200 immediately. In parallel with these write operations, element series I and I+1 are read from RAM 200 and set into RDR (0) 203 via PRDR (0) 203' and to RDR (1) 204, respectively, and they are output from the pertinent registers at 1-cycle intervals.

Operations of the embodiment according to the present invention depicted in FIG. 3 will be explained in conjunction with the timing chart shown in FIG. 4. First of all, selectors 210 and 211 are activated by an output of the 2-bit counter 212 which operates at ¼-cycle intervals. That is, selector 210 selects WDR (0) 201 and WDR (1) 202 alternately at ½-cycle intervals (the time period T0 to T2 or T2 to T0 as shown in FIG. 3) depending on the high-order bit of counter 212. Selector 211 selects WAR (0) 205, RAR (0) 207, WAR (1) 206, and RAR (1) 208 sequentially at 1/4-cycle intervals (the time period T0 to T1, T1 to T2, T2 to T3, or T3 to T0 as shown in FIG. 4 according to all of the bits (two bits) of counter 212. The selecting operations above are sequentially executed.

In FIG. 4, elements "I" and "I+1" are set to WDR (0) 201 and WDR (1) 202 at time T$\phi$. Outputs of WDR (0) 201 and WDR (1) 202 are alternately selected by selector 210. That is, WDR (0) 201 is selected during a time period from T0 to T2 and WDR (1) 202 is selected during a time period from T2 to T0. Concurrently, selector 211 selects WAR (0) 205, RAR (0) 207, WAR (1) 206, and RAR (1) 208 sequentially. That is, WAR (0) 205 is selected between T0 and T1, RAR (0) 207 between T1 and T2, WAR (1) 206 between T2 and T3, and RAR (1) 208 between T3 and T0, respectively. With these addresses, the pertinent numbers in RAM 200 are specified. In the example above, RAM 200 performs a write operation during the time periods T0−T1 and T2−T3, and it performs a read operation during the time periods T1−T2 and T3−T0. Therefore, the data of WDR (0) 201 is written in the RAM area (element number I) indicated by WAR (0) 205 during the time period T0−T1, whereas the data of WDR (1) 202 is written in the RAM area (element number I+1) indicated by WAR (1) 206 during the time period T2−T3.

The data written in RAM 200 during time periods T0−T1 and T2−T3 can be immediately read during the time periods T1−T2 and T3−T0, respectively. That is, selector 211 selects RAR (0) 207 and RAR (1) 208 during the time periods T1−T2 and T3−T0, respectively; if RAR (0) 207 and RAR (1) 208 indicate element numbers I and I+1 by use of the chaining feature, element data items corresponding to element numbers I and I+1 can be read immediately after they are written. FIG. 4 shows the timing chart of these operations. Element data corresponding to element number I is set to PRDR (0) 203' at T2, while element data corresponding to element number I+1 is set to RDR (1) 204 at T0 . The element data corresponding to element number I set to PRDR (0) 203' is transferred to RDR (0) 203 at T0, then time adjustment takes place in relation to the element data corresponding to element number I+1. Data items set to RDR (0) 203 and PDR (1) 204 are then output either to the pertinent arithmetic logic units 4 via the selector 3' or to the main storage via two write data lines 11'. The main storage of, for example, a type of multi-ways interleave memory can receive the two write data.

As can be known from explanations above, the vector register whose construction is depicted in FIG. 3 can write element data items of "I" and "I+1" in the time period of one cycle; furthermore, the vector register can read the written data immediately without causing any conflicts with respect to time for these read and write operations. Consequently, the concurrent processing and the chaining processing can be smoothly carried out at 1-cycle intervals for each element obtained from the element division with respect to vector instructions. As the RAM 200, a very-high-speed device, for example, a gallium arsenide Josephson device is preferable.

According to the present invention, a plurality of vector register accesses are possible during the time period of one cycle without causing any conflict with respect to time only by adding simple read and write circuit systems, thereby enabling the vector processor to smoothly perform the concurrent element processing and the chaining processing.

What I claim is:

1. A vector processor for executing vector instructions comprising:
   timing means for providing a timing signal;
   a plurality of pipeline-type arithmetic logic units, each connected to receive said timing signal, to receive data in a cycle pitch and providing an arithmetic data result in said cycle pitch;
   a plurality of vector registers each connected to receive said timing signal for executing 2n (n is an integer not less than one) accessing operations in succession during one cycle pitch with respect to a selected vector register; and
   data transfer means connected between said plurality of pipeline-type arithmetic logic units and said plurality of vector registers for transferring data between said pipeline-type arithmetic logic units and said vector registers.

2. A vector processor according to claim 1, each of said a plurality of vector registers comprising n write data registers, n read data registers, 2n read/write address registers, and selector means for selecting one of said write data and read data registers and one of said read/write address registers, wherein desired ones of said registers are sequentially selected by use of said selector so that n write operations and n read operations are enabled on the same vector register in one cycle pitch.

3. A vector processor according to claim 2, wherein each of said vector registers is connected to said selector with two signal lines.

4. A vector processor for executing vector instructions comprising:
   timing means for providing a timing signal 2n times during each of a plurality of successive operation cycles (where n is an integer not less than one);
   a plurality of vector registers, each connected to receive said timing signals and including vector storage means having a plurality of addressable storage locations and read/write control means responsive to said timing signal for executing 2n accessing operations in succession with respect to the storage locations of said vector storage means of a selected vector register during each operation cycle;
   a plurality of pipeline-type arithmetic logic units, each connected to receive said timing signals and data from selected ones of said plurality of vector registers in an operating cycle for providing an arithmetic data result in one operating cycle; and
   data transfer means connected between said plurality of pipeline-type arithmetic logic units and said plurality of vector registers for transferring data between said pipeline-type arithmetic logic units and said vector registers under control of said timing signal.

5. A vector processor according to claim 4, wherein said read/write control means in each of said plurality of vector registers includes n write data registers, n read data registers, n read address registers, n write address registers, and selector means responsive to said timing signal for selectively connecting said write data registers, said read address registers and said write address registers to said vector storage means to sequentially access said addressable storage location so that n write operations and n read operations are performed during one operating cycle.

6. A vector processor according to claim 5, wherein said selector means includes a first selector connecting said write data registers to said vector storage means, a second selector connecting said read address registers and said write address registers to said vector storage means, and an n bit counter responsive to said timing signal for controlling said first and second selectors.

7. A vector processor according to claim 4, wherein n=2, and each of said vector registers is connected to said data transfer means by way of two signal lines.

8. A vector processor according to claim 4, wherein said data transfer means includes a first selector connecting said outputs of said vector registers to inputs of said arithmetic logic units, and a second selector connecting outputs of said arithmetic logic units to inputs of said vector registers.

9. A vector processor according to claim 4, wherein said read/write control means in each of said plurality of vector register includes n write data registers, n read data registers, n read address registers, n write address registers, (where n is an integer not less than 2) and selector means responsive to said timing signals for selectively connecting said write data registers, said read address registers and said write address registers to said vector storage means to sequentially access a plurality of addressable storage locations of a selected vector storage means so that both a data write operation and a data read operation is effected with respect to each of said sequentially accessed addressable storage locations in one operating cycle.

10. A vector processor for executing vector instructions comprising:
   timing means for providing a timing signal a plurality of times during each of a plurality of successive operation cycles;
   a plurality of vector registers, each connected to receive said timing signals and each including vector storage means having a plurality of addressable storage locations and read/write control means responsive to said timing signals for executing a data write operation and a data read operation in succession with respect to the same storage location of a selected one of said vector storage means during each operation cycle;
   a plurality of pipeline-type arithmetic logic units, each connected to receive said timing signals and data from selected ones of said plurality of vector registers in an operating cycle for providing an arithmetic data result in one operating cycle; and
   data transfer means connected between said plurality of pipeline-type arithmetic logic units and said plurality of vector registers for transferring data between said pipeline-type arithmetic logic units and said vector registers under control of said timing signal.

* * * * *